Dec. 8, 1964    I. S. GOLDSTEIN ETAL    3,160,515
METHOD OF TREATING WOOD WITH AN IMPROVED
FIRE RETARDANT COMPOSITION
Filed Dec. 18, 1961
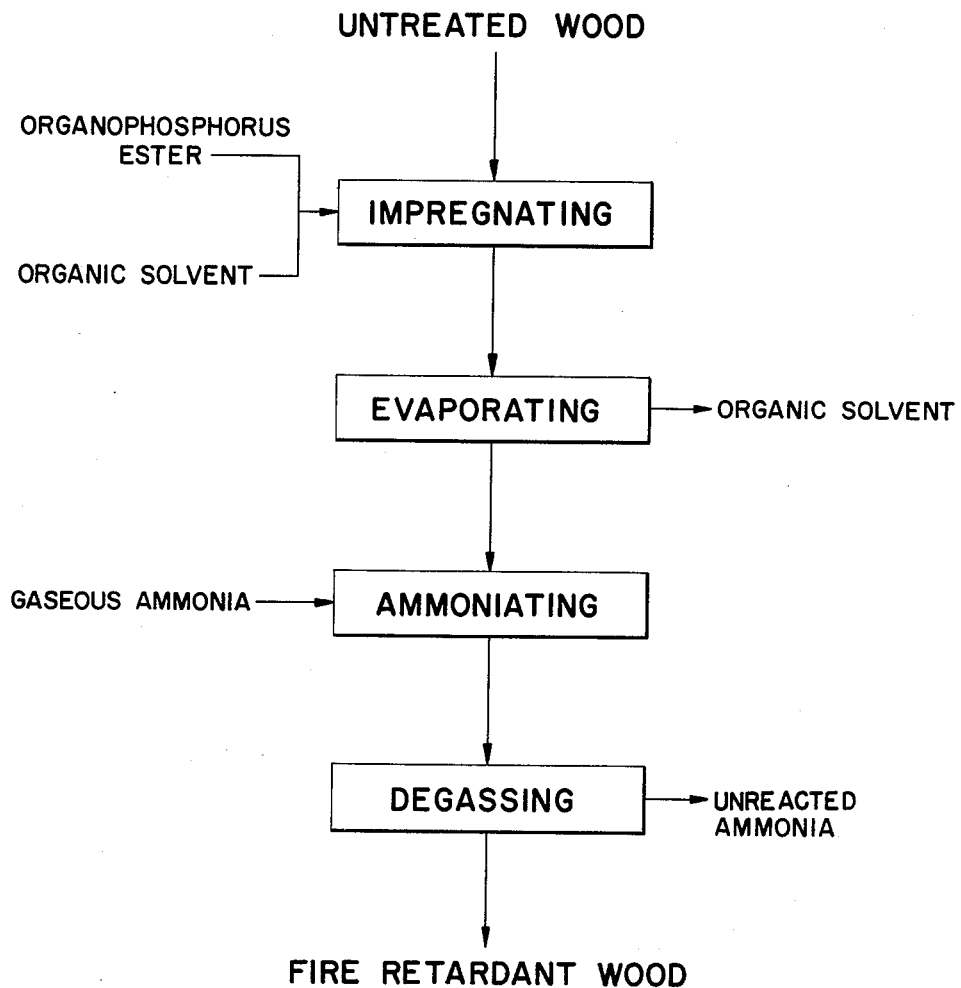
INVENTORS
IRVING S. GOLDSTEIN &
WILLIAM J. OBERLEY
BY Gerhard L. Adam
Their Attorney

United States Patent Office 3,160,515
Patented Dec. 8, 1964

3,160,515
METHOD OF TREATING WOOD WITH AN IMPROVED FIRE RETARDANT COMPOSITION
Irving S. Goldstein, Pittsburgh, and William J. Oberley, Pitcairn, Pa., assignors to Koppers Company, Inc., a corporation of Delaware
Filed Dec. 18, 1961, Ser. No. 160,321
7 Claims. (Cl. 117—62.1)

This invention relates to an improved method of treating wood with an organic fire retardant solution and the novel compounds produced thereby. In one specific aspect, it relates to an improved method of impregnating wood with an organic solvent-soluble fire retardant in an organic solution whereby the external dimensions of the wood remain unaffected by reacting the impregnated fire retardant chemical in situ with gaseous ammonia.

In our copending application, S.N. 160,322, filed on even date herewith, we described and claimed a new method of treating wood with an organic fire retardant solution. This method involves treating wood with an organic solvent-soluble fire retardant in an organic solution without affecting the external dimensions of the wood by impregnating the wood under impregnating pressure and at a temperature below the boiling point of the organic solvent under said pressure, with a solution consisting of a diester of phosphorous or phosphoric acid and an organic solvent boiling below about 80° C. By impregnating with an organic solution, instead of an aqueous solution used heretofore, we have eliminated a major difficulty which is inherent in treating wood with an aqueous medium, namely swelling and dimensional distortions of the wood produced during impregnation. Thus it is now possible to impregnate finished lumber, cut to size and shape, with fire retardant chemicals.

Quite surprisingly, we have discovered an improvement in the method of impregnating wood with an organic solvent-soluble fire retardant which produces enhanced fire retardance and also extends the scope of compounds producing effective results. This improvement involves reacting the organophosphorus compound in situ with gaseous ammonia.

It is, therefore, an object of the invention to provide an improved method of treating wood with a non-swelling fire retardant solution.

It is another object of the invention to provide a method of treating wood, impregnated with an organic solvent-soluble fire retardant, with a non-swelling medium to produce enhanced fire retardance.

In accordance with our invention, wood is impregnated with a solution of an ester of phosphoric or phosphorous acid in an organic solvent having a boiling point below about 80° C. under wood impregnating pressure at a temperature below the boiling point of the solvent under said pressure, and thereafter the organic solvent is removed from the impregnated wood. The organophosphorus ester within the impregnated solvent-free wood is then reacted under pressure with gaseous ammonia and the unreacted ammonia is removed.

The ammonium salts of organophosphorus compounds give improved fire retardant properties. A possible theory is that when the wood is burned, the ammoniated salt is broken down and decomposes to gaseous ammonia which dilutes the combustible gases to a non-combustible mixture. To impregnate the wood with the prepared ammoniated salts presents a problem since although these compounds are soluble in water, they are insoluble in organic solvents. We have now discovered a method of reaping the advantage of the ammoniated compounds while avoiding the aqueous treatment by impregnating the wood with the organophosphorus esters in an organic solution and treating the impregnated wood with gaseous ammonia whereby the salts are formed in situ. It is also possible to reverse the order of the operation so that the wood is first ammoniated and subsequently impregnated with the organophosphorus ester. These reactions may be exemplified by the following equations:

(I) 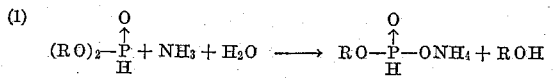

(II) 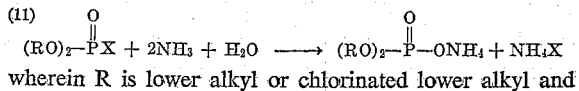

wherein R is lower alkyl or chlorinated lower alkyl and X is hydroxy.

Gaseous ammonia will react in the wood with organophosphorus esters, if small amounts of moisture are present in the wood. The moisture present in the wood usually is sufficient for the reaction to occur but a minimum of about 4 percent is required. The moisture content of dried lumber is considerably above the minimum requirement as shown by air-dried lumber which has a minimum moisture content ranging from 12 to 15 percent and kiln dried lumber of soft and hard woods which has a minimum moisture content ranging from 6 to 12 percent. The reaction on a molar basis requires about one mole water for each mole of organophosphorus ester.

Compounds useful in our invention are certain organic diesters of phosphoric and phosphorous acid and trimethyl phosphite. These compounds are diesters having the formula:

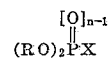

wherein R is member selected from the group consisting of lower alkyl and chlorinated lower alkyl, X is a hydroxy radical and $n$ is an integer having a value of from one to two; and trimethyl phosphite. Particularly useful compounds are: dimethyl phosphite, diethyl phosphite, diethyl phosphate, bis(beta-chloroethyl) phosphate, bis(1,3-dichloropropyl)phosphite, bis(1,3 - dichloropropyl)phosphate, and trimethyl phosphite.

The amount of ammoniated flame retardant chemical retained by the treated wood, in order to give satisfactory flame retardance, should be within a range of about 5 to 20 percent by weight of the dry wood. Less than 5 percent retention does not offer sufficient protection, whereas more than 20 percent retention is found unnecessary.

The concentration of solute in solution depends to a large extent on the void spaces in the particular wood to be treated. The usual impregnating solution contains about 10 to 25 percent of the organic solvent-soluble fire retardant material. For accurate determinations of the concentration of solute required to obtain effective fire retardance, empirical determinations should be made by taking samples of the particular wood to be treated and determining the retention of the fire retardant in the wood.

Impregnation of wood is conveniently accomplished by a full cell cycle. The object of the full cell process is to fill the structure of the wood with the treating solution. This is accomplished by subjecting the treating reactor containing the wood to be treated to a vacuum of about 22 to 26 inches of mercury for a period of time ranging from about 15 minutes to an hour. The reactor is then filled with treating solution and subjected to a pressure of about 125 to 200 p.s.i. at 25 to 100° C. for about one and a half to three hours. The larger and more dense pieces of wood require either a longer vacuum period, a longer pressure period or perhaps both. For most woods, a 15 minute vacuum of 25 to 26 inches of mercury followed by a two hour pressure process of 160 p.s.i. at ambient temperature is adequate.

Other standard impregnation techniques known to the art can also be used taking into consideration, of course, the physical nature of the wood. For example, impregnation may be accomplished by soaking, by vacuum impregnation at atmospheric pressure, by ultimate application of pressure and vacuum or by the empty cell process. The empty cell process involves forcing the impregnating solution under pressure into the wood containing air. The back pressure caused by compressing the air within the wood, forces out part of the solution when the pressure is released.

Certain low boiling organic solvents are useful for our invention. These solvents should have a boiling point below about 80° C. so that they may be readily removed from the treated wood after impregnation. Solvents useful in our invention are the lower alkyl chlorinated solvents such as chloroform, carbon tetrachloride and methylene chloride, ether, benzene and pentane. Mixtures of solvents are also useful in our invention such as benzene mixed with a liquid low boiling alkane such as pentane and hexane.

The maximum temperature at which impregnation is performed must of necessity vary with the solvent being used. Ambient temperatures are satisfactory. However, the temperature cannot be so high that it will be above the boiling point of the solvent at the operating pressure.

The pressure is not critical and wood impregnating pressure may be used such as using a pressure of up to about 150 p.s.i.

The time required for impregnation is the time conventionally used in the wood preserving art and usually varies from about 4 to 12 hours. In most cases, the time should be determined empirically to give consideration to the particular wood being impregnated.

Dry ammonia gas, from any commercially available source, is used to react with the organophosphorus esters to form a salt. The gas is forced into the wood under pressure up to about 150 p.s.i. to insure complete penetration. An excess of ammonia is used in the reaction. However, on the basis of the above equations, one mole per mole of phosphite and acid phosphate esters and two moles per mole of halophosphate esters is required. The time required for the ammonia treatment depends on numerous variables, such as the type of wood, the dimensions of the wood, and the pressure of the treatment. One method of determining whether the reaction has gone to completion is to insert a thermocouple into the wood, which since the reaction is exothermic, will show a temperature decrease when the reaction has terminated. A treatment of from one to three hours is generally sufficient. After the reaction has terminated, the unreacted gaseous ammonia is removed by diffusion at a pressure ranging from atmospheric to subatmospheric, such as a vacuum up to 30 inches Hg.

The flame retardance of wood may be conveniently measured by the percentage weight loss in the fireproof test. A standard test is the ASTM method E–69–50. Using this test, a fire-tube weight loss of approximately 40 perecnt is indicative of moderate fire retardance and less than 30 percent is considered good. In addition, the rate and extent of flame spread may be observed and estimated.

Our invention is further illustrated by the following examples:

*Example I*

Twenty pieces of southern yellow pine, having the dimensions ⅜″ x ¾″ x 40″, were impregnated at ambient temperatures with a 15 percent solution of dimethyl phosphite in benzene. Using the full cell method, the samples were placed in a treating cylinder under an initial vacuum of 27 inches Hg for 15 minutes followed by a pressure of 150 p.s.i. applied for one and one-fourth hours. The solvent was then removed from the samples by evaporation under reduced pressure. It was determined that the dimethyl phosphite retained by the dry wood was approximately 15 percent. The samples were divided into two groups of ten pieces each. One group was placed in a cylinder and subjected to reduced pressure for 15 minutes. Dry ammonia gas was, thereafter, forced into the cylinder under a pressure of 12 p.s.i. for a period of 30 minutes, after which the excess ammonia was removed by diffusion at atmospheric pressure. During the ammonia treatment, ammonium methyl phosphite was formed in situ within the impregnated samples.

Both groups of samples were tested in a fire tube apparatus according to the ASTM E–69–50 test method. A comparison between the non-ammoniated and ammoniated samples showed that: (1) dimethyl phosphite impregnated samples gave rapid and complete flame spread, and had a weight loss of 45 percent, and (2) dimethyl phosphite impregnated samples treated with ammonia gave no flame spread and had a weight loss of 20 percent.

*Example II*

The procedure of Example I was repeated using other compounds instead of dimethyl phosphite. The dried samples retained approximately 15 percent by weight of the solute. Results are given in the following table:

| Test | Compound | Percent Wt. Loss | Flame Spread |
|---|---|---|---|
| A | Bis(beta-chloroethyl)phosphite | 30 | Slight. |
|   | Bis(beta-chloroethyl)phosphite+NH₃ | 20 | None. |
| B | Diethyl phosphite | 55 | Fast and complete. |
|   | Diethyl phosphite+NH₃ | 28 | Slight. |
| C | Diethyl phosphate | 45 | Fast and complete. |
|   | Diethyl phosphate+NH₃ | 26 | Slight. |
| D | Triethyl phosphite | 72 | Fast and complete. |
|   | Triethyl phosphite+NH₃ | 75 | Do. |
| E | Tris(dichloropropyl)phosphate | 73 | Moderately fast and complete. |
|   | Tris(dichloropropyl)phosphate+NH₃ | 75 | Do. |

*Example III*

The procedure of Example I was repeated using trimethyl phosphite in a pentane solvent instead of dimethyl phosphite in a benzene solvent. The dried samples retained approximately 15 percent by weight of the solute. Results showed that: (1) trimethyl phosphite impregnated samples gave rapid and complete flame spread and had a weight loss of 73 percent, and (2) trimethyl phosphite impregnated samples treated with ammonia gave slight flame spread and had a weight loss of 30 percent.

We claim:

1. A method of treating wood with an organic solvent-soluble fire retardant in a solution of an organophosphorus solute in an organic solution without altering the dimensions of the wood, comprising the steps of:

(a) impregnating the wood, under wood impregnating pressure at a temperature below the boiling point of said solvent under said pressure, with said solution consisting essentially of said solute selected from the group consisting of trimethyl phosphite, and a compound having the formula:

$$(RO)_2 \overset{[O]_{n-1}}{P}-X$$

wherein R is a member selected from the group consisting of lower alkyl radicals and chlorinated lower alkyls, X is a hydroxy radical, and $n$ is an integer having a value of from one to two, and said solvent having a boiling point below about 80° C. and selected from the group consisting of methylene chloride, chloroform, carbon tetrachloride, ether, benzene and pentane, and mixtures thereof with low boiling alkanes, (b) evaporating said solvent, whereby between 5 percent to 20 percent of the solute is retained by the wood, (c) treating the impregnated wood containing at least four percent moisture with an excess of gaseous ammonia under wood impregnating pressure whereby the ammonium salts are produced in situ, (d) removing the excess unreacted ammonia by diffusion from the wood at a pressure ranging between atmospheric and sub-atmospheric pressure.

2. Method according to claim 1, wherein the organic solution consists of from 10 to 25 percent of trimethyl phosphite in a pentane solvent.

3. Method according to claim 1, wherein the solute is dimethyl phosphite.

4. Method according to claim 1, wherein the solute is diethyl phosphate.

5. Method according to claim 1, wherein the solute is diethyl phosphite.

6. Method according to claim 1, wherein the solute is bis(beta-chloroethyl)phosphate.

7. Method according to claim 1, wherein the solute is bis(1,3-dichloropropyl)phosphite.

References Cited by the Examiner
UNITED STATES PATENTS

| | | | |
|---|---|---|---|
| 2,143,639 | 1/39 | Caprio | 117—147 |
| 2,678,330 | 5/54 | Van Gorder et al. | 260—461.305 |
| 2,772,188 | 11/56 | Reeves et al. | 117—136 |
| 2,868,673 | 1/59 | Depew et al. | 117—147 XR |

WILLIAM D. MARTIN, *Primary Examiner.*

RICHARD D. NEVIUS, *Examiner.*